H. WOOD.
Fifth Wheel.
No. 3,159.
2 Sheets—Sheet 1.
Patented July 8, 1843.
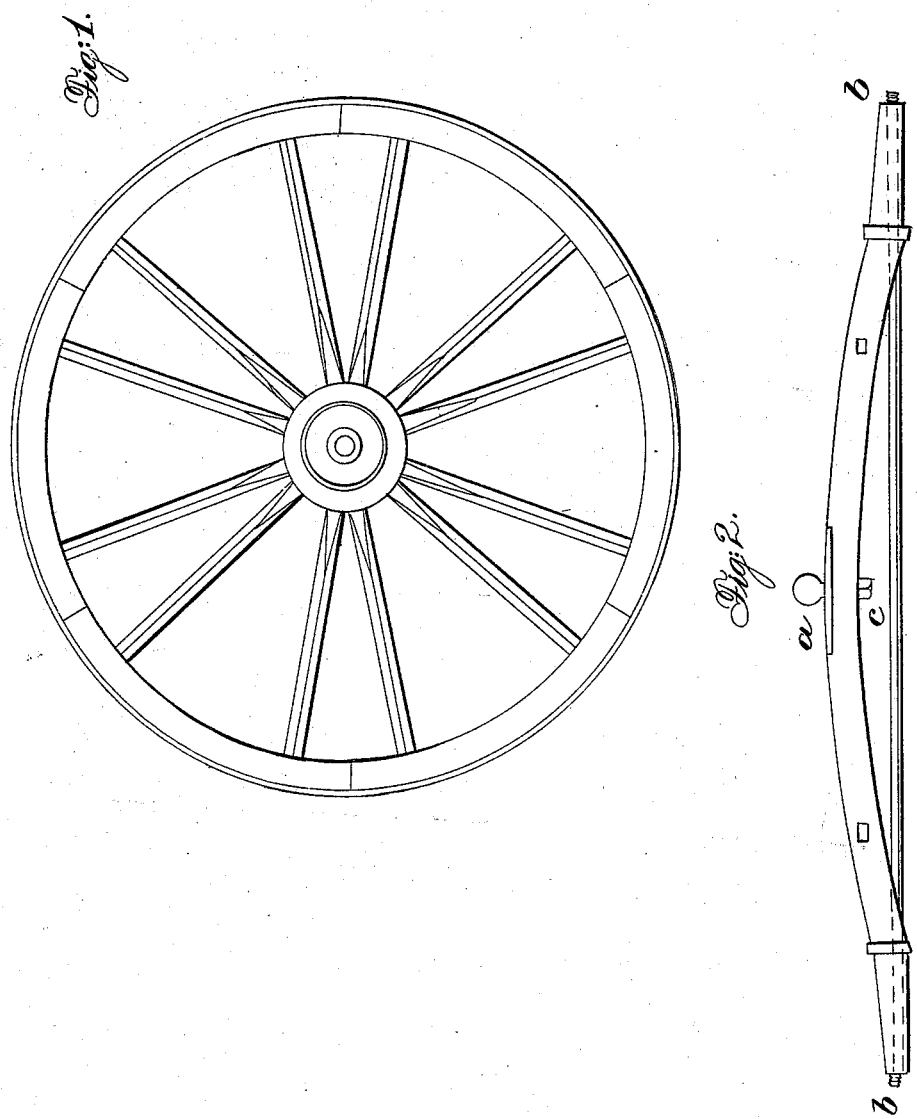

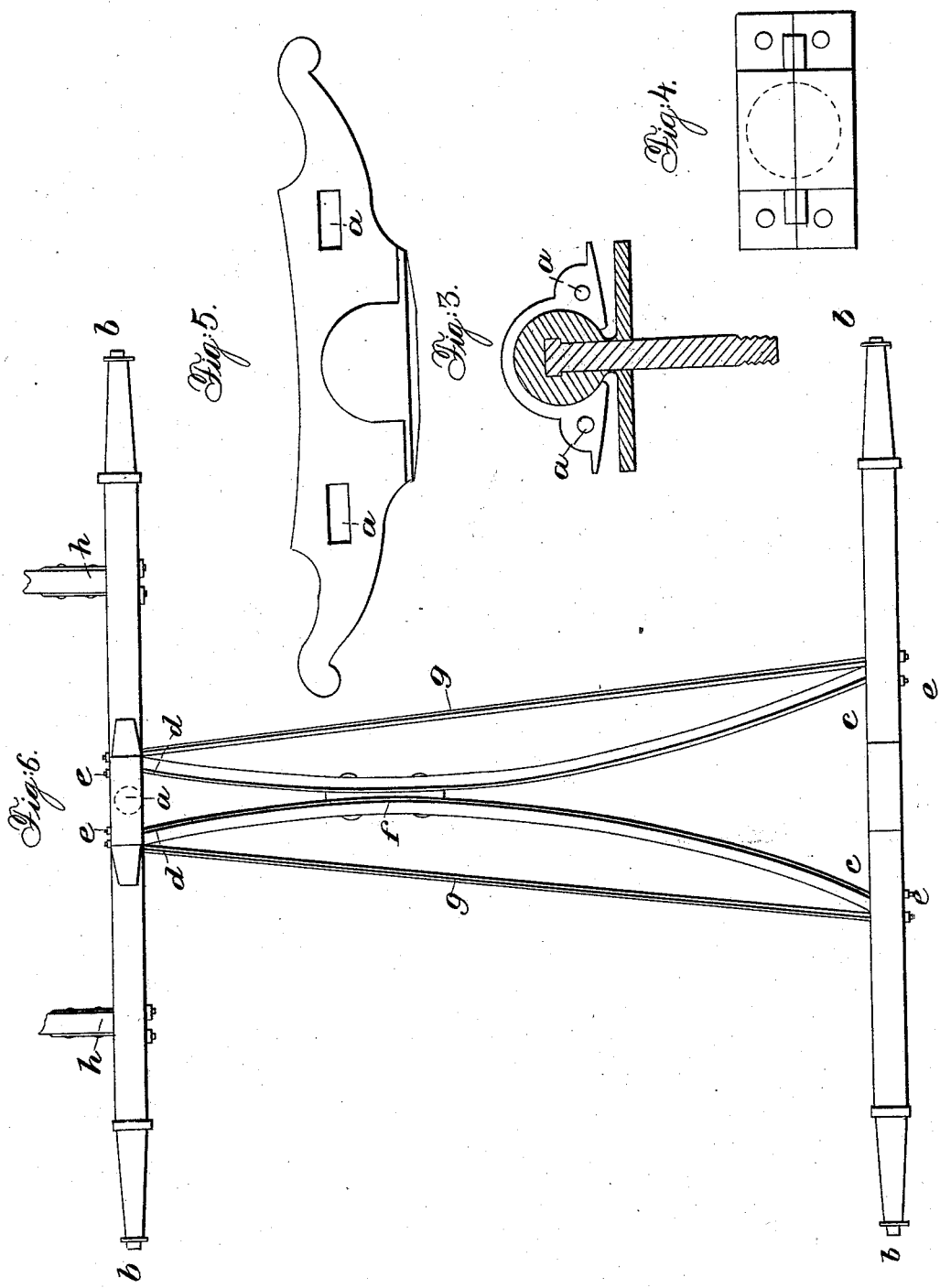

UNITED STATES PATENT OFFICE.

HORACE WOOD, OF GREENWICH, NEW YORK.

WAGON AND OTHER CARRIAGE.

Specification of Letters Patent No. 3,159, dated July 8, 1843.

*To all whom it may concern:*

Be it known that I, HORACE WOOD, of Greenwich, in the county of Washington and State of New York, have invented a new and useful Improvement in Wagons and Carriages; and I do hereby declare the following is a full and exact description.

The nature and principle of my invention consists 1st in arranging the spokes in the wheels so as to prevent the rim from bending in at the joints by dividing the felly into eleven parts and putting the spokes about two parts from the ends which makes a short space where the joints are, and long in the center as represented by Figure 1, in the accompanying drawings; 2d, in making the axletrees less liable to break or spring down by making them on the principle of an arch as shown by a back view in Fig. 2. I run an iron tension rod on a straight line under the axletree and entering the wood so as to come out at the center of the ends of the arms as at $b$, $b$ receiving nut washers on the ends as shown at $bb$ $bb$ in Fig. 6, which serve both to hold the wheels on and as abutments to keep the axletree in its arched position. I band the ends of the arms so as to fill the small box and let wear irons in for the large box. 3d, in fastening the shafts $h$ $h$, or pole firm into the axletree on an angle so that the axletree will be plumb when the horses are attached and to give free play in all directions to the front axletree and prevent wear and friction I connect it to the carriage part or gearing by inserting a ball and socket joint at $a$ Fig. 6 similar in principle to the hip or shoulder joint in the human frame, with this difference the socket incloses the ball $a$ Fig. 2 about ¾ of its surface so as to prevent its slipping out; the ball I make of cast or wrought iron and form a short neck to it the diameter of which is about ⅜ of that of the ball and connect with this neck a bed plate of a suitable size to rest on the axletree as shown in Fig. 3, by an inside view of one half of ball and socket when I make the ball and bed plate of cast iron I bed a wrought iron bolt in the sand so that the head will be in the center of the ball and of sufficient length to reach through the axletree and take a nut underneath as shown at $c$ Fig. 2. The socket I make in two halves of cast iron or other hard metal as light as possible and have sufficient strength with a bed plate corresponding with the one attached to the ball with ears or flanges as at $a$ Fig. 3 to receive the bolts to hold it together. I make the hole in the socket larger than the neck of the ball and oval, the longest way fore and aft so as to admit the ball to roll in the socket and give motion to the shafts or pole up and down. Fig. 4 is a top view of socket when together showing the bolt holes to fasten it to the head block. I fit the socket into the head block or bolster and fasten it with bolts headed in the bed plate and running up through the wood. Fig. 5 is a back view of socket and head block; when together, it mortises to receive the perches. (The head block may be made of cast iron for small work.) 4th, in the place of one perch and braces I use two perches and frame each into the back axletree about ten inches from the center as at $c$ $c$ Fig. 6 running forward and in on a curved line of about ¼ inch to the foot and entering the head block about six inches apart as at $d$ $d$ for light work; on the inside of these I fasten iron straps forged round at the ends and passing them through both axletree and head-block I fasten them with nuts as at $ee$ $ee$. I fit in a block where the perches come the nearest together and bolt through the whole as at $f$; these straps when tight prevent the perches from springing in, and to prevent their springing out I pass an iron tension rod $g$ $g$ through on a straight line outside of each perch and fasten with nuts the same as the strap. (For lumber work straight porches can be used without rods.)

Fig. 6 is a bird's eye view of carriage part or gearing when together.

What I claim as my invention and desire to secure by Letters Patent is—

1. The arrangement of the spokes in the fellies near together at the joinings of the fellies in the manner described to prevent the ends from bending in at the joints.

2. Inserting the iron tension rods through the arms of the axletree so that the nuts on the ends shall act as abutments to the arch and thus give greater strength to the arched axletree in the manner described.

3. The employment of a ball and socket joint to connect the axletree with the carriage to give free play in all directions to the axletree as described.

4. The arch perches in combination with the tension rods for the purpose and in the manner described and applying the same to all kinds of wagons and carriages where the nature of the work will admit.

HORACE WOOD.

Witnesses:
SEYMOUR CURTIS,
ASA F. HOLMES.